United States Patent
Lee et al.

(10) Patent No.: US 12,260,619 B2
(45) Date of Patent: Mar. 25, 2025

(54) IMAGE RECOGNITION METHOD, ELECTRONIC DEVICE AND READABLE STORAGE MEDIUM

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 376 days.

(21) Appl. No.: 17/854,320

(22) Filed: Jun. 30, 2022

(65) Prior Publication Data
US 2023/0386178 A1 Nov. 30, 2023

(30) Foreign Application Priority Data
May 24, 2022 (CN) .......................... 202210570817.7

(51) Int. Cl.
| | |
|---|---|
| G06V 10/26 | (2022.01) |
| G06F 18/243 | (2023.01) |
| G06V 10/764 | (2022.01) |
| G06V 10/77 | (2022.01) |
| G06V 10/774 | (2022.01) |
| G06V 10/82 | (2022.01) |
| G06V 20/70 | (2022.01) |

(52) U.S. Cl.
CPC .......... G06V 10/7715 (2022.01); G06V 10/26 (2022.01); G06V 10/764 (2022.01); G06V 10/774 (2022.01)

(58) Field of Classification Search
CPC .. G06V 10/7715; G06V 10/26; G06V 10/764; G06V 10/774; G06V 20/70; G06V 10/82; G06F 18/24317
See application file for complete search history.

(56) References Cited

U.S. PATENT DOCUMENTS

| | | | | |
|---|---|---|---|---|
| 2020/0242759 A1* | 7/2020 | Li | ............................. | G06T 7/13 |
| 2021/0166076 A1* | 6/2021 | Van Leeuwen | ........ | G16H 30/40 |
| 2021/0199643 A1* | 7/2021 | Bharitkar | ............... | G01N 33/52 |
| 2022/0207866 A1* | 6/2022 | Li | ......................... | G06V 20/70 |
| 2022/0398831 A1* | 12/2022 | Okazaki | ................. | G06V 20/13 |
| 2023/0106468 A1* | 4/2023 | Yu | ........................ | G06T 7/0012 |
| | | | | 382/100 |
| 2023/0336758 A1* | 10/2023 | Ikonin | .................... | H04N 19/59 |

FOREIGN PATENT DOCUMENTS

| CN | 112000725 | 11/2020 |
|---|---|---|
| CN | 113344079 | 9/2021 |

* cited by examiner

*Primary Examiner* — Amandeep Saini
*Assistant Examiner* — Emma Rose Goebel
(74) *Attorney, Agent, or Firm* — ScienBiziP, P.C.

(57) ABSTRACT

An image recognition method applied to an electronic device is provided. The method includes constructing a first semantic segmentation network. In response that an initial labeled result of one of a plurality of initial labeled images does not match a preset labeled result, a target image corresponding to the one of the plurality of initial labeled images and a target labeled result of the target image are obtained. A second semantic segmentation network is obtained by training the first semantic segmentation network based on a plurality of the target images and the target labeled result of each target image, and a labeled result of an image to be recognized is obtained by inputting the image to be recognized into the second semantic segmentation network.

20 Claims, 3 Drawing Sheets

IMAGE RECOGNITION METHOD, ELECTRONIC DEVICE AND READABLE STORAGE MEDIUM

FIELD

The present disclosure relates to image processing technology, in particular to an image recognition method, an electronic device, and a readable storage medium.

BACKGROUND

In an image recognition solution, due to a large number of annotation dimensions of training images and a small number of training images of each annotation dimension, a generalized ability of a trained model is poor, thus, an accuracy of image recognition is low.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

The image recognition method can be applied to one or more electronic devices 1. The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, a vehicle-mounted device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

Figure 1:
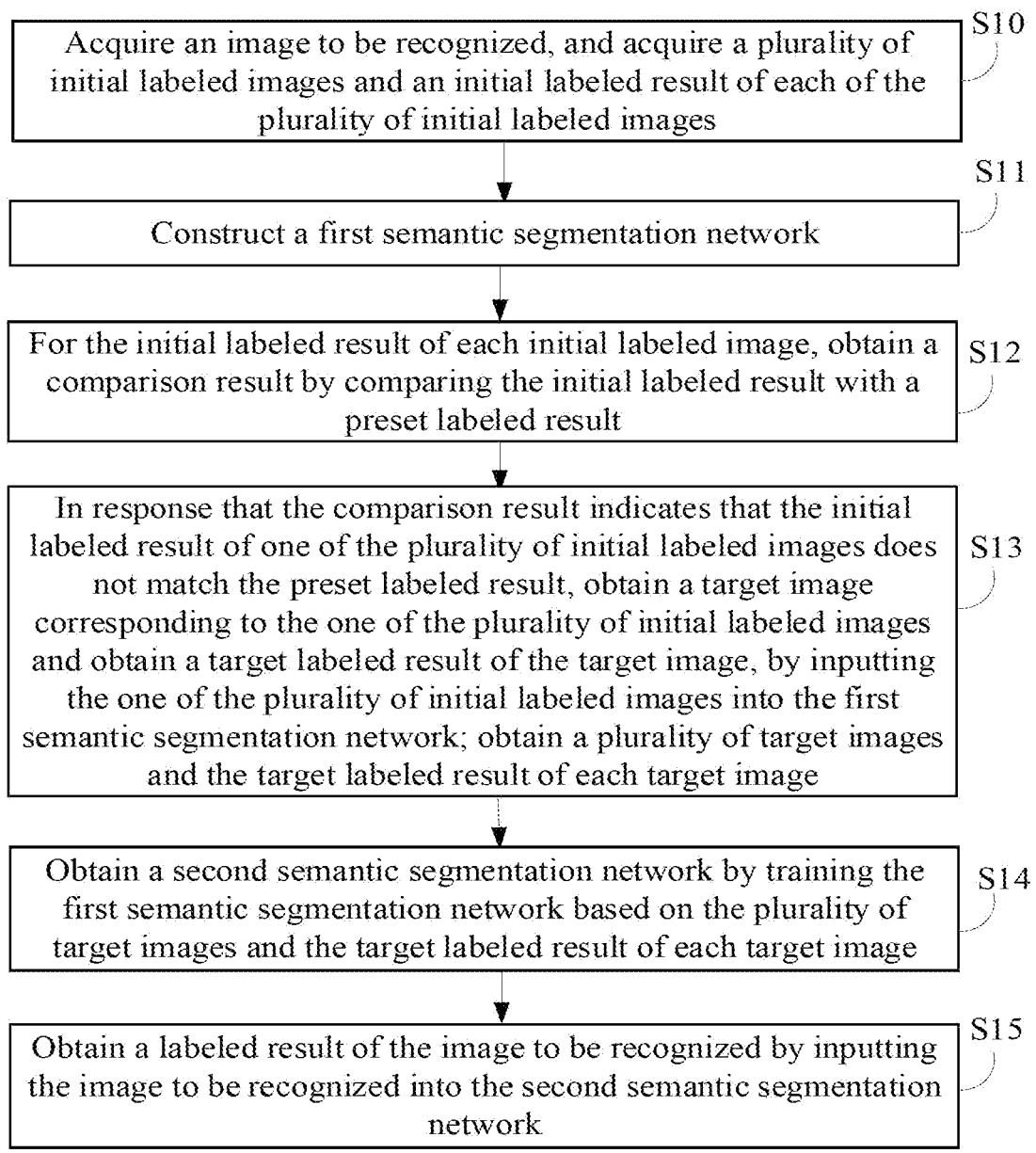
FIG. 1 is a flowchart of one embodiment of an image recognition method of the present disclosure.

FIG. 1 is a flowchart of one embodiment of an image recognition method of the present disclosure. According to different requirements, a sequence of each block in this flowchart can be adjusted according to actual requirements, and some blocks can be omitted. The execution body of this method can be an electronic device, such as the electronic device 1 shown in FIG. 3.

At block S10, the electronic device acquires an image to be recognized, and acquires a plurality of initial labeled images and an initial labeled result of each of the plurality of initial labeled images.

In at least one embodiment, the initial labeled image refers to an image in which each object (hereinafter named as "initial object") has been labeled, i.e., a corresponding labeled result is known. The initial labeled image may include one or more objects. Each of the one or more objects has been labeled with a category (hereinafter named as "initial category"), a color (hereinafter named as "initial color"), and a serial number (hereinafter named as "initial serial number").

In one embodiment, as the plurality of initial labeled images may be obtained from different databases, a method of labelling a same object may be different in different initial images, therefore, a same object in different initial labeled images may correspond to different categories, different colors, and different numbers.

In at least one embodiment, the initial labeled result of the initial labeled image includes a correspondence between an initial category and an initial label of each initial object in the initial labeled image, the initial label of each initial object refers to a correspondence between the initial color and the initial serial number of the each initial object.

The initial categories of the initial objects may include: car, tree, utility pole, pedestrian, double yellow lines, white line, and so on. The initial colors may include: gray, red, orange, yellow, yellow-green, brown, light blue, and the like.

For example, initial objects in an initial labeled image include: people, vehicle, tree, road facility, road, lane line, and initial categories corresponding to the initial objects respectively are: pedestrian, car, tree, utility pole, path, double yellow line and white line, an initial labeled result of the initial labeled image is shown in table 1:

TABLE 1

| Initial object | Initial serial number | Initial category | Initial color |
|---|---|---|---|
| people | 1 | pedestrian | light blue |
| vehicle | 2 | car | orange |
| tree | 3 | tree | yellow-green |
| road facility | 4 | utility pole | brown |
| road | 5 | path | gray |
| lane line | 6 | double yellow lines | yellow |
|  | 7 | white line | white |

In one embodiment, the electronic device obtains the plurality of initial labeled images and the initial labeled result of each initial labeled image from databases such as KITTI, Mapillary, CityScapes, and Daimler Urban.

Figure 2:
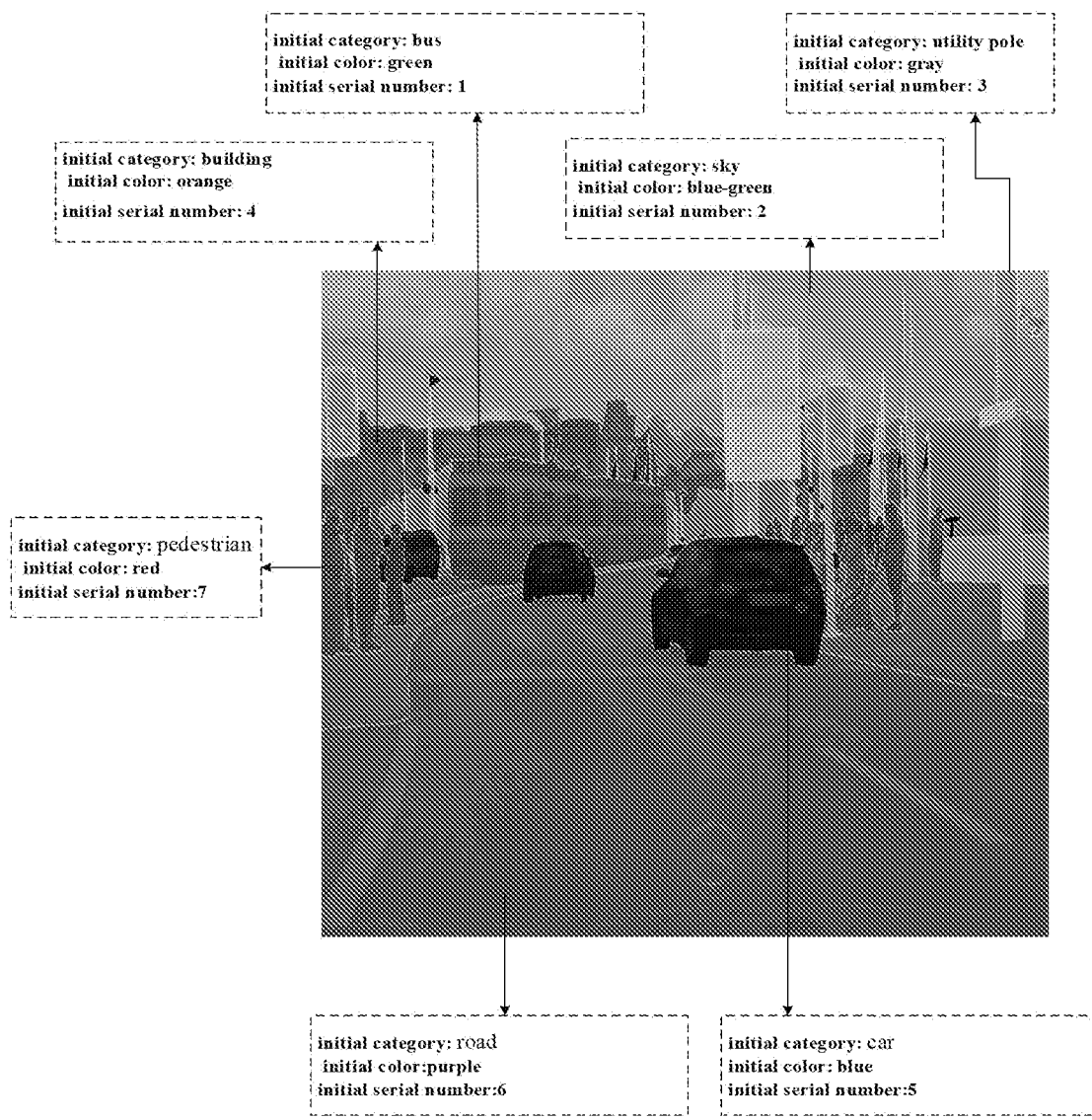
FIG. 2 illustrates an example of an initial labeled image of the present disclosure.

FIG. 2 shows an initial labeled image obtained and a corresponding initial labeled result from one of the databases. The initial labeled result indicates that initial objects in the initial labeled image correspond to a plurality of initial categories such as building, passenger car, tree, car, pedestrian, lane, sidewalk, and utility pole, etc. It should be noted that there only list label results of some objects in the initial labeled image for description. As can be seen from FIG. 2, the listed initial color and initial serial number of each initial category are different from each other.

In order to facilitate the presentation of the initial categories, initial colors and initial serial numbers corresponding to different initial objects (for example, people, vehicle, road, etc.), the initial category, initial color and initial serial number corresponding to each initial object are indicated using a dashed box in FIG. 2. The text shown in each dashed box is only exemplary descripting the corresponding initial object. The initial labeled image does not actually include the dashed box.

In one embodiment, the image to be recognized includes a plurality of objects to be recognized, and the image to be recognized refers to an image in which the category, the color, and other information of each object in the image is not labeled.

In one embodiment, the image to be recognized is obtained from images captured by a driving recorder or an in-vehicle camera.

In one embodiment, the electronic device can obtain the image to be recognized by controlling a camera or a driving recorder of a vehicle to capture a scene of an environment of the vehicle.

At block S11, the electronic device constructs a first semantic segmentation network.

In one embodiment, the first semantic segmentation network refers to a network that can be used to re-label the initial labeled image.

In one embodiment, the first semantic segmentation network includes an autoencoder and a classifier. Wherein, the autoencoder includes a plurality of cascade structures and a decoder, each cascade structure includes a plurality of hidden layers and a pooling layer. The decoder includes a plurality of serial structures, and each serial structure includes a de-pooling layer and a plurality of operation layers, the construction of the first semantic segmentation network includes:

Constructing a plurality of cascade structures each of which includes a plurality of hidden layers and a pooling layer, setting the plurality of cascade structures as an encoder; constructing a plurality of serial structures each of which includes a de-pooling layer and a plurality of operation layers; setting the plurality of the serial structures as a decoder and constructing a classifier; generating a learner based on the encoder, the decoder and the classifier; acquiring training images and training the learner based on the training images; calculating a loss value of the learner until the loss value decreases to a preset value, such that the first semantic segmentation network is obtained.

Wherein, each hidden layer includes a plurality of convolution layers, a batch standard layer and an activation function layer, the pooling layer is a maximum pooling layer, and each operation layer includes a plurality of deconvolution layers, the batch standard layer and the activation function layer, the activation function layer may be an ReLu linear rectification function.

The encoder refers to a network that can be used to perform feature extraction on the initial labeled image, the decoder refers to a network that can be used to restore features extracted by the encoder, the encoder and the decoder have a symmetric structure, a decoding process is an inverse process of an encoding process.

In other embodiments, the first semantic segmentation network may be a network such as U-Net, DeepLab v1, DeepLab v2, and Mask R-CNN, not being limited in this disclosure.

At block S12, for the initial labeled result of each initial labeled image, the electronic device obtains a comparison result by comparing the initial labeled result with a preset labeled result.

In one embodiment, the preset labeled result refers to a correspondence between a preset category, a preset color/preset color label, and a preset serial number.

In one embodiment, the comparison result includes: the initial labeled result matching the preset labeled result, or the initial labeled result not matching the preset labeled result.

In one embodiment, before comparing the initial labeled result with the preset labeled result, the method further includes:

Obtaining a plurality of preset color labels, a plurality of preset serial numbers, and a plurality of preset categories; obtaining a plurality of target labels by establishing a corresponding relationship between each preset serial number and each color label; and obtaining the preset labeled result by establishing a relationship between each preset category and each target label.

Wherein, the plurality of preset color labels include: red, green, blue, gray, etc., and the plurality of preset serial numbers may be: 1, 2, 3, 4, and so on.

The plurality of preset categories include: lane, lane line, intersection, zebra crossing, curb, tree, sidewalk, car, bicycle, motorcycle, pedestrian, stroller, large vehicle, truck, traffic light, traffic sign, road sign, building, street light, utility pole, static obstacle, and dynamic obstacle, etc. It can be understood that the plurality of preset categories includes as much as possible the category of each target object appearing on the road.

For example, the target objects include: people, vehicle, tree, road facility, road, lane line, obstacle, and the corresponding initial categories are: pedestrian, car, truck, van, tree, utility pole, road, lane line, dynamic obstacle, and static obstacle.

For example, the preset labeled result can be as shown in table 2:

TABLE 2

| Target object | Preset serial number | Preset category | Color label |
|---|---|---|---|
| people | 1 | pedestrian | purple |
| vehicle | 2 | car | orange |
|  | 3 | truck | yellow |
|  | 4 | van | red |
| tree | 5 | tree | green |
| road facility | 6 | utility pole | pink |
| road | 7 | road | brown |
| lane line | 8 | lane line | gray |
| obstacle | 9 | static obstacle | yellow-green |
|  | 10 | dynamic obstacle | black |
| . . . | . . . | . . . | . . . |

In one embodiment, the initial labeled result of each initial labeled image includes a plurality of initial categories and an initial label corresponds to each initial category, and the obtaining of the comparison result by comparing the initial labeled result with the preset labeled result includes:

Acquiring each initial object in the initial labeled image, and determining the initial category corresponding to each initial object in the initial labeled image; determining that the initial labeled result does not match the preset labeled result, when at least one of the plurality of initial categories does not have a corresponding preset category in the preset labeled result; or, determining that the initial labeled result does not match the preset labeled result when each initial category has a corresponding preset category in the preset labeled result but at least one initial label in the initial labeled result does not have a corresponding target label in the preset labeled result.

In this embodiment, when the initial category does not have a corresponding preset category, the initial object corresponding to the initial category and the target object corresponding to the plurality of preset categories may be same or different.

Further, a plurality of situations exists when the initial object corresponding to the initial category is the same as the target object corresponding to the plurality of preset categories, the plurality of situations, for example, includes a situation that a name of the initial category is different from a name of the preset category, so that the initial category does not have a corresponding preset category. For example, a classification of the preset category is too narrow or too broad, so that the name of the initial category is different from the name of the preset category.

The initial label corresponding to each initial category being different from the corresponding target label indicates that the relationship between the initial color and the initial serial number is inconsistent with the relationship between the preset color label and the preset serial number.

In this embodiment, if each initial category in the initial label result has a corresponding preset category, and the initial label corresponding to the each initial category is the same as the target label of the corresponding preset category, the electronic device determines that the initial labeled result matches the preset labeled result.

Through the above embodiments, the electronic device can determine whether the initial labeled result of the initial labeled image matches the preset labeled result. The initial labeled image does not need to re-labeled when the initial labeled result of the initial labeled image is matches the preset labeled result, this can improve a label efficiency.

From the table 1 and table 2, it can be seen that in the initial labeled result of table 1, the initial categories of "path", "double yellow lines", and "white line" are not included in table 2. In other words, in table 2, there are no corresponding preset categories for the initial categories of "path", "double yellow lines", and "white line". In detail, the target object "road" described in table 2 corresponds to a preset category "road", but in the table 1, the object "road" corresponds to the category of "path". The object "lane line" in table 1 corresponds to two categories, i.e., "double yellow lines" and "white line", but in table 2, the object "lane line" corresponds to only one category "lane line". In other words, the initial labeled result in table 1 does not match the preset labeled result in table 2.

At block S13, when the comparison result indicates that the initial labeled result of one of the plurality of initial labeled images does not match the preset labeled result, the electronic device obtains a target image corresponding to the one of the plurality of initial labeled images and obtains a target labeled result of the target image, by inputting the one of the plurality of initial labeled images into the first semantic segmentation network.

In one embodiment, the target image refers to an image that is generated by re-labeling the one of the plurality of initial labeled images by using the first semantic segmentation network.

In one embodiment, the obtaining of the target image corresponding to the one of the plurality of initial labeled images and obtaining of the target labeled result of the target image, by inputting the one of the plurality of initial labeled images into the first semantic segmentation network includes:

Generating a target feature map by processing the one of the plurality of initial labeled images using the autoencoder; obtaining a category corresponding to each pixel point in the target feature map by classifying the each pixel point using the classifier; generating the target image and the target labeled result by labeling the target feature map based on the obtained category corresponding to each pixel point and the target label corresponding to the obtained category.

Through the above-mentioned embodiments, the electronic device obtains the target feature map by compressing and decompressing the one of the plurality of initial labeled images using the autoencoder. Since noise in image (hereinafter named as "image noise") of the one of the plurality of initial labeled images is filtered out during the compression process, the generated target feature map is clearer. The electronic device can obtain a plurality of target images by re-labelling a plurality of initial labeled images each of which the initial labeled result does not match the preset labeled result, such that the label result of the same target object in each of the plurality of target images is unified.

Specifically, the generating of the target feature map by processing the one of the plurality of initial labeled images using the autoencoder includes:

Obtaining an initial feature map output by a last hidden layer of a plurality of hidden layers in one of the plurality of cascade structures, by extracting features from the one of the plurality of initial labeled images using the plurality of hidden layers; performing a pooling operation on the initial feature map via a pooling layer of the one of the plurality of cascade structures and outputting a first feature map; inputting the first feature map into a cascade structure next to the one of the plurality of cascade structures, until another first feature map output by the last cascade structure is obtained; setting the first feature map output by the last cascade structure as a second feature map; obtaining a first pixel value of each pixel point in each of a plurality of the first feature maps and obtaining a first position of the first pixel value in the corresponding initial feature map; obtaining a second pixel value of each pixel point in the second feature map and obtaining a second position of the second pixel value in the corresponding initial feature map; obtaining the target feature map by performing a decoding operation on the second feature map based on the first position and the second position using the decoder.

Specifically, the obtaining of the target feature map by performing the decoding operation on the second feature map based on the first position and the second position using the decoder includes:

Constructing a zero feature map of a corresponding size according to a size of the initial feature map output by each cascade structure, and filling each pixel value in the second feature map into the corresponding zero feature map according to the second position, thereby obtaining a third feature map output by the de-pooling layer in the first serial structure; obtaining a fourth feature map output by the first serial structure by performing a deconvolution operation on the third feature map using the plurality of operational layers in the first serial structure; inputting the fourth feature map into a next serial structure; obtaining a fifth feature map output by the next serial structure using the fourth feature map, the corresponding first position, and the plurality of operation layers in the next serial structure; obtaining the fifth feature map output by the last serial structure and setting the fifth feature map output by the last serial structure as the target feature map. The zero feature map is a feature map in which a pixel value of each pixel point equals zero.

In this embodiment, because the target feature map is obtained by decoding the second feature map based on the first position and the second position, i.e., more information as to position is kept such that the features contained in the target feature map are more complete.

Specifically, the obtaining of the category corresponding to each pixel point in the target feature map by classifying the each pixel point using the classifier includes:

Calculating a score value of each pixel point in the target feature map based on the pixel value of each pixel point in the target feature map; calculating a probability that the pixel point corresponding to the score value belongs to each preset category, based on the score value and the plurality of preset categories; determining one of the plurality of preset categories corresponding to the probability with a largest value as the category corresponding to the pixel point.

In this embodiment, because the preset category corresponding to the probability with the largest value is determined as the category corresponding to the pixel point, the accuracy of classifying each pixel point is improved.

Specifically, a formula of calculating the probability is:

$$S_i = \frac{e^{z_j}}{\sum_j^k e^{z_j}} \cdot i = 1, 2, \ldots, k;$$

Wherein, $S_i$ represents a probability that each pixel point belongs to the ith preset category, $e^{z_j}$ represents the score value of the jth pixel point in the target feature map, $z_j$ represents the pixel value of the jth pixel point in target feature map, $\sum_j^k e^{z_j}$ represents a total score value of all pixel points in the target feature map, i represents the ith preset category, k represents a number of the plurality of preset categories.

Specifically, the electronic device takes the pixel value of each pixel point as the logarithm of the exp exponential function to obtain a score value of each pixel point, the exp exponential function refers to an exponential function with e as the base.

Specifically, the generating of the target image and the target labeled result by labeling the target feature map based on the obtained category corresponding to each pixel point and the target label corresponding to the obtained category includes:

Determining a region formed by all the pixel points corresponding to the same category in the target feature map as a feature region; adjusting the pixel value of each of all the pixel points in the feature region to be a preset serial number corresponding to the same category; obtaining the target region by performing coloring processing on each pixel point in the feature region according to the preset color label corresponding to the preset serial number of the feature region; obtaining the target image by splicing a plurality of the target regions according to a position of each of the plurality of target regions in the target feature map; and determining the preset serial number, preset color label and the category corresponding to each target region in the target image as the target labeled result.

In this embodiment, each pixel point in the feature region and the pixel value of the each pixel point can be quickly adjusted according to the preset labeled result, so that each region in the target image is rendered more conspicuous.

Following the above example, the target labeled result of the initial labeled image is shown in table 3:

TABLE 3

| Target region | Preset serial number corresponding to each target region | Category | Preset color label corresponding to each target region |
| --- | --- | --- | --- |
| people | 1 | pedestrian | purple |
| vehicle | 2 | car | orange |
| tree | 5 | tree | green |
| road facility | 6 | utility pole | pink |
| road | 7 | road | brown |
| lane line | 8 | lane line | gray |

The electronic device can obtain a plurality of target images and the target labeled result of each target image according to block S13.

At block S14, the electronic device obtains a second semantic segmentation network by training the first semantic segmentation network based on the plurality of target images and the target labeled result of each target image.

In at least one embodiment, the second semantic segmentation network refers to a network generated after training the first semantic segmentation network using the plurality of target images and the target labeled result of each target image.

In at least one embodiment, a process of generating the second semantic segmentation network is basically the same as the process of generating the first semantic segmentation network, which is not repeated in this disclosure.

Through the above-mentioned embodiments, the first semantic segmentation network is trained by using the plurality of target images and the target labeled result corresponding to each target image to obtain the second semantic segmentation image, and by increasing the number of training images, so that the second semantic segmentation network has a higher recognition accuracy. Since the labeled result of each of the plurality of target images for the same object is unified, the second semantic segmentation network can automatically apply a unified label to a plurality of target images to be identified.

At block S15, the electronic device obtains a labeled result of the image to be recognized by inputting the image to be recognized into the second semantic segmentation network.

In at least one embodiment, the labeled result includes a category of each object in the image to be recognized, a serial number of the each object, and a color label of the each object.

In at least one embodiment, the process of generating the labeled result is basically the same as the process of generating the target labeled result, not being limited in this disclosure.

In this embodiment, since the image to be recognized is an image captured by a driving recorder or an in-vehicle camera, each object in the image to be recognized can be accurately recognized by using the second semantic segmentation network. By obtaining the labeled result, the driver can obtain accurate road condition information, thereby improving driving safety.

It can be seen from the above technical solutions, the initial labeled images are obtained from different datasets, and the initial labeled results of the initial labeled images from different datasets for the same target object are different (that is, the same target object is marked in different ways in the initial labeled images). The electronic device uses the first semantic segmentation network to re-label the initial labeled image. In one embodiment, the first semantic segmentation network is trained based on images each of which with the preset labeled result. The target images generated by the first semantic segmentation network have the same target labeled results for the same target object (i.e., the labeling method of the same target object in each target image is unified). The electronic device trains the first semantic segmentation network based on a plurality of the target images and the target labeled result of each target image to obtain the second semantic segmentation network. Since the training data of the first semantic segmentation network is increased and the labeling method of the training images is unified, the generated second semantic segmentation network has better generalization ability, thereby improving the accuracy of the labeling result.

Figure 3:
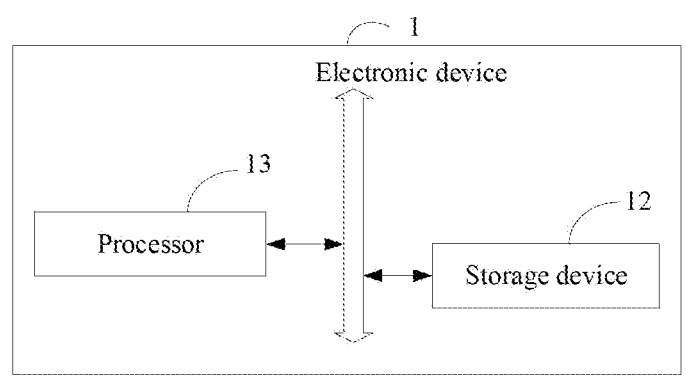
FIG. 3 is a structural diagram of one embodiment of an electronic device implementing the image recognition method of the present disclosure.

As shown in FIG. 3, it is a schematic structural diagram of an electronic device according to one embodiment of the image recognition method of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of image recognition.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device. 1.

The processor 13 obtains the operating system of the electronic device 1 and obtains various installed applications. The processor 13 obtains the application program to implement each block in the embodiments of the foregoing image recognition method, for example, to implement each block shown in FIG. 1.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 1, the storage device 12 in the electronic device 1 stores a plurality of instructions to implement the image recognition method, and the processor 13 can acquire the plurality of instructions to implement: acquiring an image to be recognized, and acquiring a plurality of initial labeled images and an initial labeled result of each of the plurality of initial labeled images; constructing a first semantic segmentation network; for the initial labeled result of each initial labeled image, obtaining a comparison result by comparing the initial labeled result with a preset labeled result; in response that the comparison result indicates that the initial labeled result of one of the plurality of initial labeled images does not match the preset labeled result, obtaining a target image corresponding to the one of the plurality of initial labeled images and obtaining a target labeled result of the target image, by inputting the one of the plurality of initial labeled images into the first semantic segmentation network; obtaining a second semantic segmentation network by training the first semantic segmentation network based on a plurality of the target images and the target labeled result of each target image; and obtaining a labeled result of the image to be recognized by inputting the image to be recognized into the second semantic segmentation network.

Specifically, for the specific implementation method of the above-mentioned instruction by the processor 13, reference may be made to the description of the relevant blocks in the corresponding embodiment of FIG. 1, and details are not described herein.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image recognition method applied to an electronic device, the method comprising:

acquiring an image to be recognized, and acquiring a plurality of initial labeled images and an initial labeled result of each of the plurality of initial labeled images from databases, wherein the initial labeled result of the initial labeled image comprises a correspondence between an initial category and an initial label of each initial object in the initial labeled image, the initial label of each initial object refers to a correspondence between an initial color and an initial serial number of the each initial object;

constructing a first semantic segmentation network;

for the initial labeled result of each initial labeled image, obtaining a comparison result by comparing the initial labeled result with a preset labeled result, comprising: determining that the initial labeled result does not match the preset labeled result, in response that each initial category has a corresponding preset category in the preset labeled result but at least one initial label in the initial labeled result does not have a corresponding target label in the preset labeled result, wherein the preset labeled result indicates a relationship between each preset category of each target object and each target label, and each target label indicates a relationship between a preset color label and a preset serial number;

in response that the comparison result indicates that the initial labeled result of one of the plurality of initial labeled images does not match the preset labeled result, obtaining a target image corresponding to the one of the plurality of initial labeled images and obtaining a target labeled result of the target image, by inputting the one of the plurality of initial labeled images into the first semantic segmentation network, which refers to a network for re-labelling the one of the plurality of initial labeled images;

obtaining a plurality of target images and obtaining the target labeled result of each target image;

obtaining a second semantic segmentation network by training the first semantic segmentation network based on the plurality of target images and the target labeled result of each target image; and obtaining a labeled result of the image to be recognized by inputting the image to be recognized into the second semantic segmentation network.

2. The image recognition method according to claim 1, wherein before comparing the initial labeled result with the preset labeled result, the method further comprises:

obtaining a plurality of preset color labels, a plurality of preset serial numbers, and a plurality of preset categories;

obtaining a plurality of target labels by establishing a corresponding relationship between each preset serial number and each color label; and obtaining the preset labeled result by establishing a corresponding relationship between each preset category and each target label.

3. The image recognition method according to claim 2, wherein the initial labeled result of each initial labeled image comprises a plurality of initial categories and an initial label corresponds to each initial category, the obtaining of the comparison result by comparing the initial labeled result with the preset labeled result comprises:

acquiring each initial object in the initial labeled image, and determining the initial category corresponding to each initial object in the initial labeled image;

determining that the initial labeled result does not match the preset labeled result, when at least one of the plurality of initial categories does not have a corresponding preset category in the preset labeled result; or determining that the initial labeled result does not match the preset labeled result when each initial category has a corresponding preset category in the preset labeled result but at least one initial label in the initial labeled result does not have a corresponding target label in the preset labeled result.

4. The image recognition method according to claim 2, wherein the first semantic segmentation network comprises an autoencoder and a classifier, the obtaining of the target image corresponding to the one of the plurality of initial labeled images and obtaining of the target labeled result of the target image, by inputting the one of the plurality of initial labeled images into the first semantic segmentation network comprises:

generating a target feature map by processing the one of the plurality of initial labeled images using the autoencoder;

obtaining a category corresponding to each pixel point in the target feature map by classifying the each pixel point using the classifier; and generating the target image and the target labeled result by labeling the target feature map based on the obtained category corresponding to each pixel point and the target label corresponding to the obtained category.

5. The image recognition method according to claim 4, wherein the autoencoder comprises a plurality of cascade structures and a decoder, the generating of the target feature map by processing the one of the plurality of initial labeled images using the autoencoder comprises:

obtaining an initial feature map output by a last hidden layer of a plurality of hidden layers in one of the plurality of cascade structures, by extracting features from the one of the plurality of initial labeled images using the plurality of hidden layers;

performing a pooling operation on the initial feature map via a pooling layer of the one of the plurality of cascade structures and outputting a first feature map;

inputting the first feature map into a cascade structure next to the one of the plurality of cascade structures, until another first feature map output by the last cascade structure is obtained;

setting the first feature map output by the last cascade structure as a second feature map;

obtaining a first pixel value of each pixel point in each of a plurality of the first feature maps and obtaining a first position of the first pixel value in the corresponding initial feature map;

obtaining a second pixel value of each pixel point in the second feature map and obtaining a second position of the second pixel value in the corresponding initial feature map;

obtaining the target feature map by performing a decoding operation on the second feature map based on the first position and the second position using the decoder.

6. The image recognition method according to claim 5, wherein the obtaining of the category corresponding to each pixel point in the target feature map by classifying the each pixel point using the classifier comprises:

calculating a score value of each pixel point in the target feature map based on the pixel value of each pixel point in the target feature map;

calculating a probability that the pixel point corresponding to the score value belongs to each preset category, based on the score value and the plurality of preset categories;

determining one of the plurality of preset categories corresponding to the probability with a largest value as the category corresponding to the pixel point.

7. The image recognition method according to claim 6, wherein a formula of calculating the probability is:

$$S_i = \frac{e^{z_j}}{\sum_j^k e^{z_j}} \cdot i = 1, 2, \ldots, k;$$

wherein, $S_i$ represents a probability that each pixel point belongs to the ith preset category, $e^{z_j}$ represents the score value of the jth pixel point in the target feature map, $z_j$ represents the pixel value of the jth pixel point in target feature map, $\Sigma_j^k e^{z_j}$ represents a total score value of all pixel points in the target feature map, i represents the ith preset category, k represents a number of the plurality of preset categories.

8. The image recognition method according to claim 5, wherein the generating of the target image and the target labeled result by labeling the target feature map based on the obtained category corresponding to each pixel point and the target label corresponding to the obtained category comprises:

determining a region formed by all the pixel points corresponding to the same category in the target feature map as a feature region;

adjusting the pixel value of each of all the pixel points in the feature region to be a preset serial number corresponding to the same category;

obtaining the target region by performing coloring processing on each pixel point in the feature region according to the preset color label corresponding to the preset serial number of the feature region;

obtaining the target image by splicing a plurality of the target regions according to a position of each of the plurality of target regions in the target feature map; and determining the preset serial number, preset color label and the category corresponding to each target region in the target image as the target labeled result.

9. An electronic device comprising:

a storage device;

at least one processor; and the storage device storing one or more programs, which when executed by the at least one processor, cause the at least one processor to:

acquire an image to be recognized, and acquire a plurality of initial labeled images and an initial labeled result of each of the plurality of initial labeled images from databases, wherein the initial labeled result of the initial labeled image comprises a correspondence between an initial category and an initial label of each initial object in the initial labeled image, the initial label of each initial object refers to a correspondence between an initial color and an initial serial number of the each initial object;

construct a first semantic segmentation network;

for the initial labeled result of each initial labeled image, obtain a comparison result by comparing the initial labeled result with a preset labeled result, comprising: determining that the initial labeled result does not match the preset labeled result, in response that each initial category has a corresponding preset category in the preset labeled result but at least one initial label in the initial labeled result does not have a corresponding target label in the preset labeled result, wherein the preset labeled result indicates a relationship between each preset category of each target object and each target label, and each target label indicates a relationship between a preset color label and a preset serial number;

in response that the comparison result indicates that the initial labeled result of one of the plurality of initial labeled images does not match the preset labeled result, obtain a target image corresponding to the one of the plurality of initial labeled images and obtain a target labeled result of the target image, by inputting the one of the plurality of initial labeled images into the first semantic segmentation network, which refers to a network for re-labelling the one of the plurality of initial labeled images;

obtaining a plurality of target images and obtaining the target labeled result of each target image;

obtain a second semantic segmentation network by training the first semantic segmentation network based on the plurality of target images and the target labeled result of each target image; and obtain a labeled result of the image to be recognized by inputting the image to be recognized into the second semantic segmentation network.

10. The electronic device according to claim 9, wherein before comparing the initial labeled result with the preset labeled result, the at least one processor is further caused to:

obtain a plurality of preset color labels, a plurality of preset serial numbers, and a plurality of preset categories;

obtain a plurality of target labels by establishing a corresponding relationship between each preset serial number and each color label; and obtain the preset labeled result by establishing a corresponding relationship between each preset category and each target label.

11. The electronic device according to claim 10, wherein the initial labeled result of each initial labeled image comprises a plurality of initial categories and an initial label corresponds to each initial category, the obtaining of the comparison result by comparing the initial labeled result with the preset labeled result comprises:

acquiring each initial object in the initial labeled image, and determining the initial category corresponding to each initial object in the initial labeled image;

determining that the initial labeled result does not match the preset labeled result, when at least one of the plurality of initial categories does not have a corresponding preset category in the preset labeled result; or determining that the initial labeled result does not match the preset labeled result when each initial category has a corresponding preset category in the preset labeled result but at least one initial label in the initial labeled result does not have a corresponding target label in the preset labeled result.

12. The electronic device according to claim 10, wherein the first semantic segmentation network comprises an autoencoder and a classifier, the obtaining of the target image corresponding to the one of the plurality of initial labeled images and obtaining of the target labeled result of the target image, by inputting the one of the plurality of initial labeled images into the first semantic segmentation network comprises:

generating a target feature map by processing the one of the plurality of initial labeled images using the autoencoder;

obtaining a category corresponding to each pixel point in the target feature map by classifying the each pixel point using the classifier; and generating the target image and the target labeled result by labeling the target feature map based on the obtained category corresponding to each pixel point and the target label corresponding to the obtained category.

13. The electronic device according to claim 12, wherein the autoencoder comprises a plurality of cascade structures and a decoder, the generating of the target feature map by processing the one of the plurality of initial labeled images using the autoencoder comprises:

obtaining an initial feature map output by a last hidden layer of a plurality of hidden layers in one of the plurality of cascade structures, by extracting features from the one of the plurality of initial labeled images using the plurality of hidden layers;

performing a pooling operation on the initial feature map via a pooling layer of the one of the plurality of cascade structures and outputting a first feature map;

inputting the first feature map into a cascade structure next to the one of the plurality of cascade structures, until another first feature map output by the last cascade structure is obtained;

setting the first feature map output by the last cascade structure as a second feature map;

obtaining a first pixel value of each pixel point in each of a plurality of the first feature maps and obtaining a first position of the first pixel value in the corresponding initial feature map;

obtaining a second pixel value of each pixel point in the second feature map and obtaining a second position of the second pixel value in the corresponding initial feature map;

obtaining the target feature map by performing a decoding operation on the second feature map based on the first position and the second position using the decoder.

14. The electronic device according to claim 13, wherein the obtaining of the category corresponding to each pixel point in the target feature map by classifying the each pixel point using the classifier comprises:

calculating a score value of each pixel point in the target feature map based on the pixel value of each pixel point in the target feature map;

calculating a probability that the pixel point corresponding to the score value belongs to each preset category, based on the score value and the plurality of preset categories;

determining one of the plurality of preset categories corresponding to the probability with a largest value as the category corresponding to the pixel point.

15. The electronic device according to claim 14, wherein a formula of calculating the probability is:

$$S_i = \frac{e^{z_j}}{\sum_j^k e^{z_j}} \cdot i = 1, 2, \ldots, k;$$

wherein, $S_i$ represents a probability that each pixel point belongs to the ith preset category, $e^{z_j}$ represents the score value of the th pixel point in the target feature map, $z_j$ represents the pixel value of the ith pixel point in target feature map, $\sum_j^k e^{z_j}$ represents a total score value of all pixel points in the target feature map, i represents the ith preset category, k represents a number of the plurality of preset categories.

16. The electronic device according to claim 13, wherein the generating of the target image and the target labeled result by labeling the target feature map based on the obtained category corresponding to each pixel point and the target label corresponding to the obtained category comprises:

determining a region formed by all the pixel points corresponding to the same category in the target feature map as a feature region;

adjusting the pixel value of each of all the pixel points in the feature region to be a preset serial number corresponding to the same category;

obtaining the target region by performing coloring processing on each pixel point in the feature region according to the preset color label corresponding to the preset serial number of the feature region;

obtaining the target image by splicing a plurality of the target regions according to a position of each of the plurality of target regions in the target feature map; and determining the preset serial number, preset color label and the category corresponding to each target region in the target image as the target labeled result.

17. A non-transitory storage medium having instructions stored thereon, when the instructions are executed by a processor of an electronic device, the processor is caused to perform an image recognition method, wherein the method comprises:

acquiring an image to be recognized, and acquiring a plurality of initial labeled images and an initial labeled result of each of the plurality of initial labeled images from databases, wherein the initial labeled result of the initial labeled image comprises a correspondence between an initial category and an initial label of each initial object in the initial labeled image, the initial label of each initial object refers to a correspondence between an initial color and an initial serial number of the each initial object;

constructing a first semantic segmentation network;

for the initial labeled result of each initial labeled image, obtaining a comparison result by comparing the initial labeled result with a preset labeled result, comprising: determining that the initial labeled result does not match the preset labeled result, in response that each initial category has a corresponding preset category in the preset labeled result but at least one initial label in the initial labeled result does not have a corresponding target label in the preset labeled result, wherein the preset labeled result indicates a relationship between each preset category of each target object and each target label, and each target label indicates a relationship between a preset color label and a preset serial number;

in response that the comparison result indicates that the initial labeled result of one of the plurality of initial labeled images does not match the preset labeled result, obtaining a target image corresponding to the one of the plurality of initial labeled images and obtaining a target labeled result of the target image, by inputting the one of the plurality of initial labeled images into the first semantic segmentation network, which refers to a network for re-labelling the one of the plurality of initial labeled images;

obtaining a plurality of target images and obtaining the target labeled result of each target image;

obtaining a second semantic segmentation network by training the first semantic segmentation network based on the plurality of target images and the target labeled result of each target image; and obtaining a labeled result of the image to be recognized by inputting the image to be recognized into the second semantic segmentation network.

18. The non-transitory storage medium according to claim 17, wherein before comparing the initial labeled result with the preset labeled result, the method further comprises:

obtaining a plurality of preset color labels, a plurality of preset serial numbers, and a plurality of preset categories;

obtaining a plurality of target labels by establishing a corresponding relationship between each preset serial number and each color label; and obtaining the preset labeled result by establishing a corresponding relationship between each preset category and each target label.

19. The non-transitory storage medium according to claim 18, wherein the initial labeled result of each initial labeled image comprises a plurality of initial categories and an initial label corresponds to each initial category, the obtaining of the comparison result by comparing the initial labeled result with the preset labeled result comprises:

acquiring each initial object in the initial labeled image, and determining the initial category corresponding to each initial object in the initial labeled image;

determining that the initial labeled result does not match the preset labeled result, when at least one of the plurality of initial categories does not have a corresponding preset category in the preset labeled result; or determining that the initial labeled result does not match the preset labeled result when each initial category has a corresponding preset category in the preset labeled result but at least one initial label in the initial labeled result does not have a corresponding target label in the preset labeled result.

20. The non-transitory storage medium according to claim 18, wherein the first semantic segmentation network comprises an autoencoder and a classifier, the obtaining of the target image corresponding to the one of the plurality of initial labeled images and obtaining of the target labeled result of the target image, by inputting the one of the plurality of initial labeled images into the first semantic segmentation network comprises:

generating a target feature map by processing the one of the plurality of initial labeled images using the autoencoder;

obtaining a category corresponding to each pixel point in the target feature map by classifying the each pixel point using the classifier; and generating the target image and the target labeled result by labeling the target feature map based on the obtained category corresponding to each pixel point and the target label corresponding to the obtained category.

* * * * *